United States Patent [19]
Baker

[11] Patent Number: 4,755,372
[45] Date of Patent: Jul. 5, 1988

[54] CATALYTIC SULFUR DEGASSING

[75] Inventor: Daniel C. Baker, Houston, Tex.

[73] Assignee: Shell Oil Company, Houston, Tex.

[21] Appl. No.: 43,738

[22] Filed: Apr. 29, 1987

[51] Int. Cl.$^4$ .................... B01J 27/04; C01B 25/027
[52] U.S. Cl. .................................. 423/578 R; 502/216
[58] Field of Search ................ 423/578 R; 502/216

[56] References Cited

U.S. PATENT DOCUMENTS

| 2,376,223 | 5/1945 | Bender | 252/205 |
| 3,720,627 | 3/1973 | Jarvis | 252/430 |
| 4,671,803 | 6/1987 | Suggitt | 48/197 |

OTHER PUBLICATIONS

Tuller, W. N., "The Analytical Chemistry of Sulfur and Its Compounds," Ed. J. H. Karchmer, Wiley—Interscience, New York (1970), pp. 63–67.
*Sulfur*, No. 173, Jul.–Aug. 1984, pp. 36–37.
Schicho et al., *CEP*, Oct. 1985, pp. 42–44.

*Primary Examiner*—Robert L. Stoll
*Assistant Examiner*—Adriana L. Mui

[57] ABSTRACT

Liquid sulfur is degassed by passing through a bed of catalyst comprising at least one inorganic metal sulfide.

13 Claims, 2 Drawing Sheets

CATALYTIC SULFUR DEGASSING

BACKGROUND OF THE INVENTION

1. Field of the Invention

The present invention relates to a process for the catalytic degassing of sulfur.

2. Description of the Art

Hydrogen sulfide and hydrogen polysulfide are present in Claus sulfur. To avoid problems and meet sulfur requirements, the sulfur is "degassed" to remove these contaminants by mechanical means, catalytic means or a combination of both. *Sulphur,* No. 173, July–August, 1984, pages 36–37, describes degassing of liquid sulphur in which catalysts are not generally used but when present are commonly ammonia, ammonium salts or organic nitrogen compounds, e.g., DIPA (diisopropylamine). Schicho, C. M. et al., *CEP,* October, 1985, pages 42–44, describe the addition of an unnamed catalyst solution to the sulfur pit and the use of lead sulfide added to a molten sulfur sample as a catalyst in the analytical procedures of the process. Use of lead sulfide as the degassing catalyst was considered unsatisfactory by the authors because of the undesirability of introducing lead into admixture with the sulfur in the pit.

SUMMARY OF THE INVENTION

The present invention is directed to a process for reducing the hydrogen sulfide and hydrogen polysulfide content of liquid sulfur by passing liquid sulfur through a bed of catalyst comprising at least one inorganic metal sulfide.

Use of a metal sulfide catalyst bed allows for faster degassing than conventional pit degassing in sulfur plants, including those integrated with gasification.

Any conventional inorganic metal sulfide catalyst which will decompose or remove hydrogen sulfide and hydrogen polysulfides can be used which is adaptable to bed techniques. In one embodiment of the invention, the organic metal sulfide catalyst is a Group VIII metal sulfide, including Fe, Co, Ni, Pb, Pt, Pd and the like. Preferably, the metal sulfide is PbS.

In one embodiment of the present invention, any catalytically active inorganic sulfide contained in a gas stream from the processing of coal, shale, tar sands or mineral ore can be used. In one embodiment the inorganic sulfide is selected from CuS, PbS, ZnS, CdS, MgS, CrS, TiS, FeS or mixtures thereof or equivalent kinds of organic sulfides. One convenient source of catalytic inorganic sulfide is PbS, e.g., a mixture of sulfides rich in PbS, and one convenient source of the mixture is a gas stream produced by the partial oxidation of coal.

In another embodiment of the invention, the inorganic sulfide is deposited on the surface of the carrier, which includes the external surface and surface of any internal pores or passages. The deposit includes physical, chemical and/or physiochemical capture of the vaporized inorganic sulfide or small fines of inorganic sulfide (rich) particles on the carrier.

The choice of carrier is not critical and includes conventional solid carriers known in the catalyst art. In one embodiment of the invention, the carrier is an inorganic carrier. Suitable examples of inorganic carriers include carbon, inorganic oxides, minerals and solid by-products (e.g., slag) of the processing of coal, shale, tar sands, mineral ores, spent catalyst compositions, or equivalent kinds of solid inorganic carriers. One convenient carrier is slag (flyslag), especially obtained from the partial oxidation of coal.

The above catalysts prepared from waste slag and/or metal sulfide by-products from the processing of coal, shale, tar sands or mineral ore are disclosed and claimed in applicants concurrently filed U.S. patent application Ser. No. 043,737, the disclosures of which are incorporated by reference and also summarized herein.

The recovering of slag particles suitable for use as a carrier is conducted using conventional procedures, e.g., screening, cycloning or the like, to select particles of the size described. The size will of course depend on the kind of inorganic metal sulfide(s) to be deposited and the ultimate use of the catalyst, which is within the skill of the art. For example, suitable slag particles sizes include those from about 0.5 mm to about 10 mm.

The degassing catalyst bed of the invention can be any conventional bed arrangement which can allow liquid sulfur to flow through in a free and rapid manner and which will not allow the catalyst itself to become entrained in the liquid sulfur. In one embodiment of the invention, the bed is (a) a gravity flow through a porous material, commonly a trickle bed, or (b) dense bed with high flow through, commonly a packed bed. Conveniently, the catalyst is prepared in or subsequently placed in portable, exchangeable cartridge units which can be installed in the line(s) of a Claus unit running from the reactors to the central collection or rundown pit. Alternatively, such cartridges can be inserted into the pit itself. Choice of bed can be selected for plant size and general plant operating conditions.

In one embodiment of the invention, the use of the in line or in the pit degassing catalyst bed of the invention can be combined with a subsequent step of mechanical degassing in which conventional means, such as stirrers, agitators an/or inert gas (air, $N_2$, steam or the like) sweeps are employed.

The degassing is conducted at temperatures which maintain sulfur in the liquid state at the pressure of the process, such as from about 140° C. to about 170° C. at atmospheric pressure.

In the sulfur recovery unit the hydrogen sulfide is converted to elemental sulfur by the well-known Claus reaction. Sulfur recovery units of the Claus type or Claus plants are widely used in industry and are well established and the process of the invention is applicable thereto.

In the following description, "Claus reaction" refers to the reaction between hydrogen sulfide and sulfur dioxide in which elemental sulfur and water are produced. By "sulfur recovery unit of the Claus type" or "Claus plant" is meant a plant for carrying out the Claus reaction, incorporating a thermal zone in which hydrogen sulfide is partially combusted to produce sulfur dioxide in the correct proportion which then reacts with the unburned hydrogen sulfide to give sulfur and water, the sulfur then being condensed and recovered, followed by one or more catalytic zones in which the same reaction is further promoted by means of a suitable catalyst and additional sulfur is recovered.

The process carried out in a Claus plant is sometimes referred to in literature as modified Claus process.

DETAILED DESCRIPTION OF THE INVENTION

Figure 1:
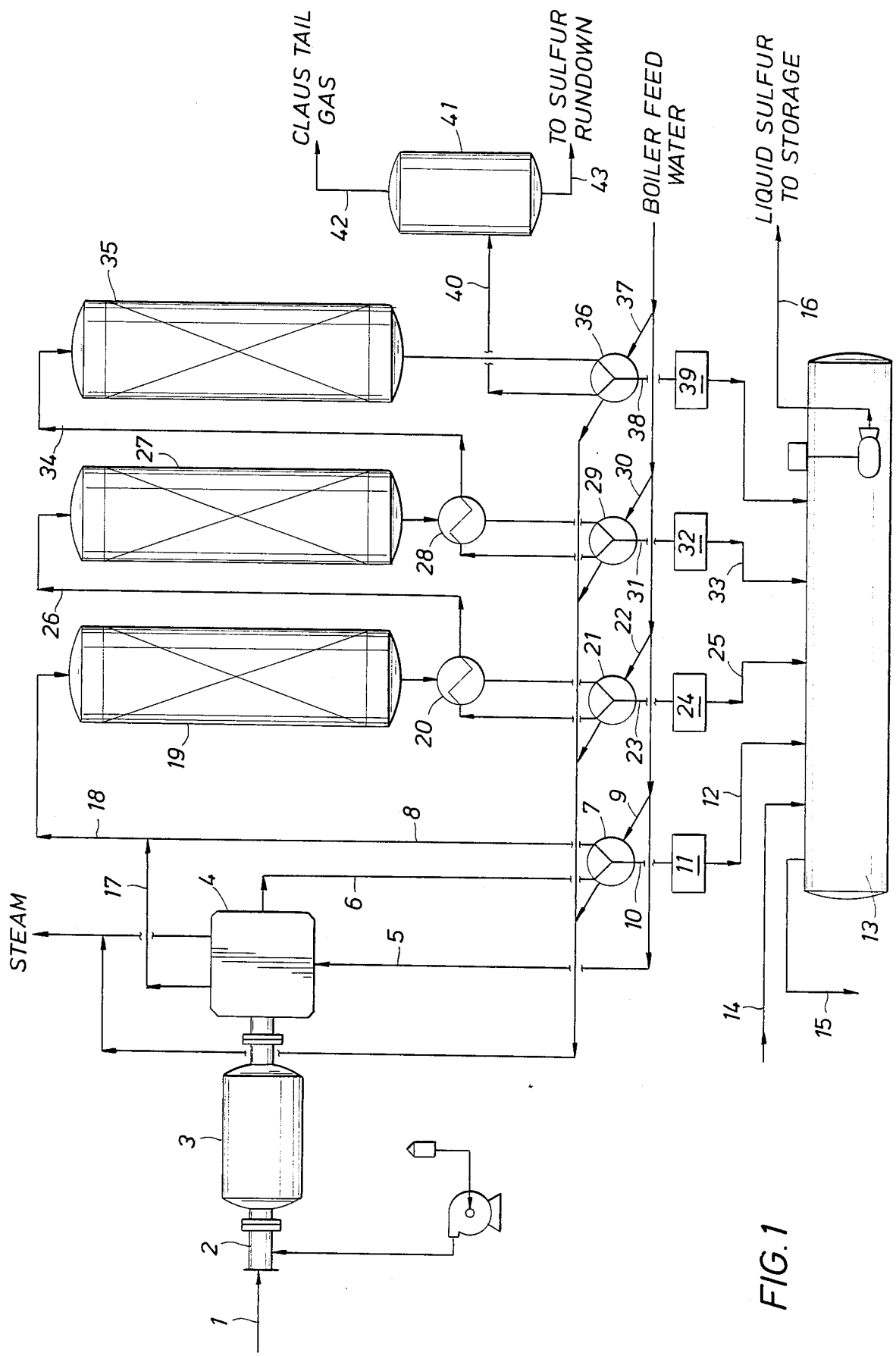
FIG. 1 is a schematic representation of a Claus sulfur production process with degassing of the liquid sulfur by passing it through the catalyst bed of the present invention.

In order to illustrate the invention more fully, reference is made to the accompanying schematic drawing. The drawing is of the process flow type in which auxiliary equipment, such as valves, pumps, holding vessels, etc. have been omitted therefrom. All valves are merely exemplary or calculated.

With reference to FIG. 1, acid gas is passed via line (1) at a temperature of about 100° F. and a pressure of about 29.5 psia into the burner (2) of a Claus system reaction furnace (3) to be combusted with an oxygen-air mixture. The reactants are combusted at the burner (2) and evolve into the reaction furnace (3) where the endothermic reactions of the Claus process occur. The reactor furnace effluent passes through a heat exchanger or, preferably, a waste heat boiler (4) wherein the combustion effluents are cooled against boiler feed water in line (5). The cooled effluent is then introduced via line (6) into the first condenser (7) wherein the effluent is again heat exchanged against boiler feed water in line (9). Effluent passes via line (8) to further treatment. Liquid sulfur is condensed out in line (10) and is passed downward through a degassing zone (11) containing a bed of catalyst comprising (a carrier having deposited on the surface thereof) at least one inorganic metal sulfide. The catalytically treated liquid sulfur is generally removed via line (12) to a central collection pit (13) which can collect sulfur from many condensation units (if included). If desired, the pit (13) is equipped with mechanical degassing means, such as stirrers, agitators and/or inert gas sweeps (line 14). If desired, the pit (13) is equipped with mechanical degassing means, such as stirrers, agitators and/or inert gas sweeps (line 14). If necessary, additional chemical degassing can be conducted by adding conventional catalytic or reactive chemicals to the pit. Expelled gases are removed via line (15) and liquid elemental sulfur via line (16).

The gaseous combustion effluent is removed from the waste heat boiler via line (17) and together with effluent in line (8) is passed via line (18) into a catalytic converter reactor (19) where additional quantities of hydrogen sulfide and sulfur dioxide are reacted to produce additional sulfur which is introduced into a heat exchanger (20) and then into sulfur condenser (21) where it is heat exchanged with boiler feed water in line (22). Liquid sulfur is condensed out in line (23) and is passed downward through a degassing zone (24) containing an additional bed of inorganic metal sulfide catalyst and the catalytically treated liquid sulfur passed via line (25) to the central collection pit (13). Optionally, the gaseous combustion effluent is passed through additional cycles of sulfur production starting with its passage to heat exchanger (20) and then through one or more additional catalytic converter cycles via lines and apparatus (26) through (33) and lines and apparatus (34) through (40). The steam in line (40) is introduced into a tailgas coalescer (41) wherein additional sulfur mist is removed via line (43) and the residual gas stream in line (42) is sent to a conventional tailgas clean-up unit.

Partial combustion or gasification of coal involves reacting the coal at elevated temperatures and possibly elevated pressures with a limited volume of oxygen, the reaction preferably being carried out in the presence of additional agents such as steam, carbon dioxide, or various other materials. Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyslag or flyash. This flyslag, because it is derived from a "reducing" atmosphere, tends to be different in composition and properties from flyash normally associated with combustion boilers where a fully oxidizing atmosphere is utilized. For example, the flyslag from processes for partial combustion of coal may contain elemental iron, sulphides and deposited carbon, components not normally associated with boiler flyash. In general, the flyslag or lighter flyash entrained with the gas in partial combustion processes is usually removed from the raw synthesis gas by a combination of cyclones or separators, or a water scrubbing system employing washer coolers, venturi scrubbers, of filters or electrostatic precipitators, or combinations of these systems.

The raw synthesis gas from the gasifier or gasification zone contains, in addition to the aforementioned materials, sulfur-containing gases, such as hydrogen sulfide and carbonyl sulfide, as well as small amounts of inorganic metal sulfides. The presence of these inorganic metal sulfides as vaporized materials and small fines in synthesis gas derived from the gasification of coal complicates removal of additional impurities, including acidic gases, such as $H_2S$ and/or $CO_2$, and poses problems insofar as product quantity and pollution control requirements are concerned.

The flyslag or flyash removed from the synthesis gas have heretofore generally been considered as having undesirable properties insofar as its ultimate use or disposal is concerned. For example, it may be light, friable, dusty and dificult to compact. Because it may contain unsuitable species such as aresnic, selenium, and sulfides, it must be handled with care, and, if it is to be utilized or disposed of as land fill, must be in a form which does not release such materials readily to the environment. The invention addresses the problem of flyslag utilization, concomitantly accomplishing the treatment and utilization of other normal inorganic metal sulfide lighter weight waste products from the gasification process, which could otherwise complicate the removal of acidic gases.

In another embodiment of the present invention there is provided a process for the preparation of (1) synthesis gas reduced in solids and acidic gases and (2) elemental sulfur which comprises (a) treating coal, shale, or tar sands with oxygen to produce a synthesis gas stream containing inorganic sulfides; (b) recovering slag particles from the synthesis gas and selecting particles thereof suitable for use as a catalyst carrier; (c) treating the slag particles from step (b) with the synthesis gas substantially free of slag particles to deposit on the surface slag particles a catalytic amount of at least one metal sulfide; (d) treating the synthesis gas from step (c) to remove acidic gases suitable for sulfur production; (e) converting the acid gases from step (d) to liquid sulfur; and (f) contacting the liquid sulfur with the catalytic slag particles from step (c) to reduce the hydrogen sulfide and hydrogen polysulfide content of the sulfur.

The partial combustion of coal to produce synthesis gas, which is essentially carbon monoxide and hydrogen, and particulate flyslag, is well known, and a survey of known processes is given in "Ullmanns Enzyklopadie Der Technischen Chemie", Vol. 10 (1958), pp. 360–458. Several such processes for the preparation of hydrogen and carbon monoxide, flyslag-containing gases are currently being developed. Accordingly, details of the gasification process are related only insofar as is necessary for understanding of the present invention.

In general, the gasification is carried out by partially combusting the coal with a limited volume of oxygen at a temperature normally between 800° C. and 2000° C., and preferably at a temperature of between 1050° C. and 2000° C. If a temperature between 1050° C. and 2000° C. is employed, the product gas may contain very small amounts of gaseous side products such as tars, phenols and condensable hydrocarbons. Suitable coals include lignite, bituminous coal, sub-bituminous coal, anthracite coal, and brown coal. Lignites and bituminous coals are preferred. In order to achieve a more rapid and complete gasification, initial pulverization of the coal is preferred. Particle size is preferably selected so that 70% of the solid coal feed can pass a 200-mesh sieve. The gasification is preferably carried out in the presence of oxygen and steam, the purity of the oxygen preferably being at least 90% by volume, nitrogen, carbon dioxide and argon being permissible as impurities. If the water content of the coal is too high, the coal should be dried before use. The atmosphere will be maintained reducing by the regulation of the weigh ratio of the oxygen to moisture and ash free coal in the range of 0.6 to 1.0, preferably 0.8 to 0.9. The specific details of the equipment and procedures employed form no part of the invention, but those described in U.S. Pat. No. 4,350,103, and U.S. Pat. No. 4,458,607, both incorporated herein by reference, may be employed. Although, in general, it is preferred that the ratio between oxygen and steam be selected so that from 0.1 to 1.0 parts by volume of steam is present per part by volume of oxygen, the invention is applicable to processes having substantially different ratios of oxygen to steam. The oxygen used is preferably heated before being contacted with the coal, preferably to a temperature of from about 200° C. to 500° C.

The details of the gasification reactor system form no part of the present invention, and suitable reactors are described in British Pat. No. 1501284 and U.S. Pat. No. 4,022,591. The high temperature at which the gasification is carried out is obtained by reacting the coal with oxygen and steam in a reactor at high velocity. A preferred linear velocity is from 10 to 100 meters per second, although higher or lower velocities may be employed. The pressure at which the gasification can be effected may vary between wide limits, preferably being from 1 to 200 bar. Residence times may vary widely; common residence times of from 0.2 to 20 seconds are described, with residence times of from 0.5 to 15 seconds being preferred.

After the starting materials have been converted, the reaction product, which comprises hydrogen, carbon monoxide, carbon dioxide, and water, as well as the aforementioned impurities, is removed from the reactor. This gas, which normally has a temperature between 1050° C. and 1800° C., contains the impurities mentioned and flyslag, including carbon-containing solids. In order to permit removal of these materials and impurities from the gas, the reaction product stream should be first quenched and cooled. A variety of elaborate techniques has been developed for quenching and cooling the gaseous stream, the techniques in general being characterized by use of a quench gas and a boiler in which steam is generated with the aid of the waste heat. Cyclones or other suitable techniques may be provided for removing particulate solids from the gaseous stream. Even though such procedures may be practiced, further reduction of the solids content may nevertheless be desirable and can be accomplished by depositing these materials on a carrier, such as slag, in an independent process or as steps integrated into a combined gasification-sulfur production system. Accordingly, the source of the flyslag is not critical, but, of course, the most usual source will be the flyslag produced in a previous step of the process, or in an associated gasification process scheme if a gasification zone having a multiplicity of reactors is utilized. the flyslag may also be that from which residual carbon values have been removed, as for example, by combustion of "ordinary" flyslag, or as described in copending application Ser. No. 813,737, entitled "Flyash Process", by Hardesty, filed Dec. 27, 1985, incorporated herein by reference. Any suitable selection device or devices, such as screens, may be utilized for the selection of slag suitable for use as a carrier.

The synthesis gas which is recovered from the metal sulfide catalyst synthesis zone contains sulfur impurities in the form of gaseous sulfur compounds. In order to reduce these sulfur constituents to acceptably low levels prior to its ultimate use, the gas is contacted with a conventional liquid absorbent which absorbs hydrogen sulfide, which is then regenerated to give hydrogen sulfide-rich gases. These latter gases are then pass to the Claus sulfur recovery unit. In the present invention, any conventional absorbent can be used such as amines, glycols, glycol ethers, sulfones, sulfoxides, amides and the like or mixtures thereof with each other or water. For example, the absorbent can be sulfolane, N-methyl-pyrrolidone, triethylene glycol, methyl diethanol amine and the like. The loaded absorbent is regenerated by heating and/or stripping with steam. The hydrogen sulfide-rich gas mixture freed by regeneration of the absorbent is usually cooled and then passed to the Claus sulfur recovery unit to recover elemental sulfur from the gas as previously described using the degassing inorganic metal sulfide catalyst bed of the invention.

Figure 2:
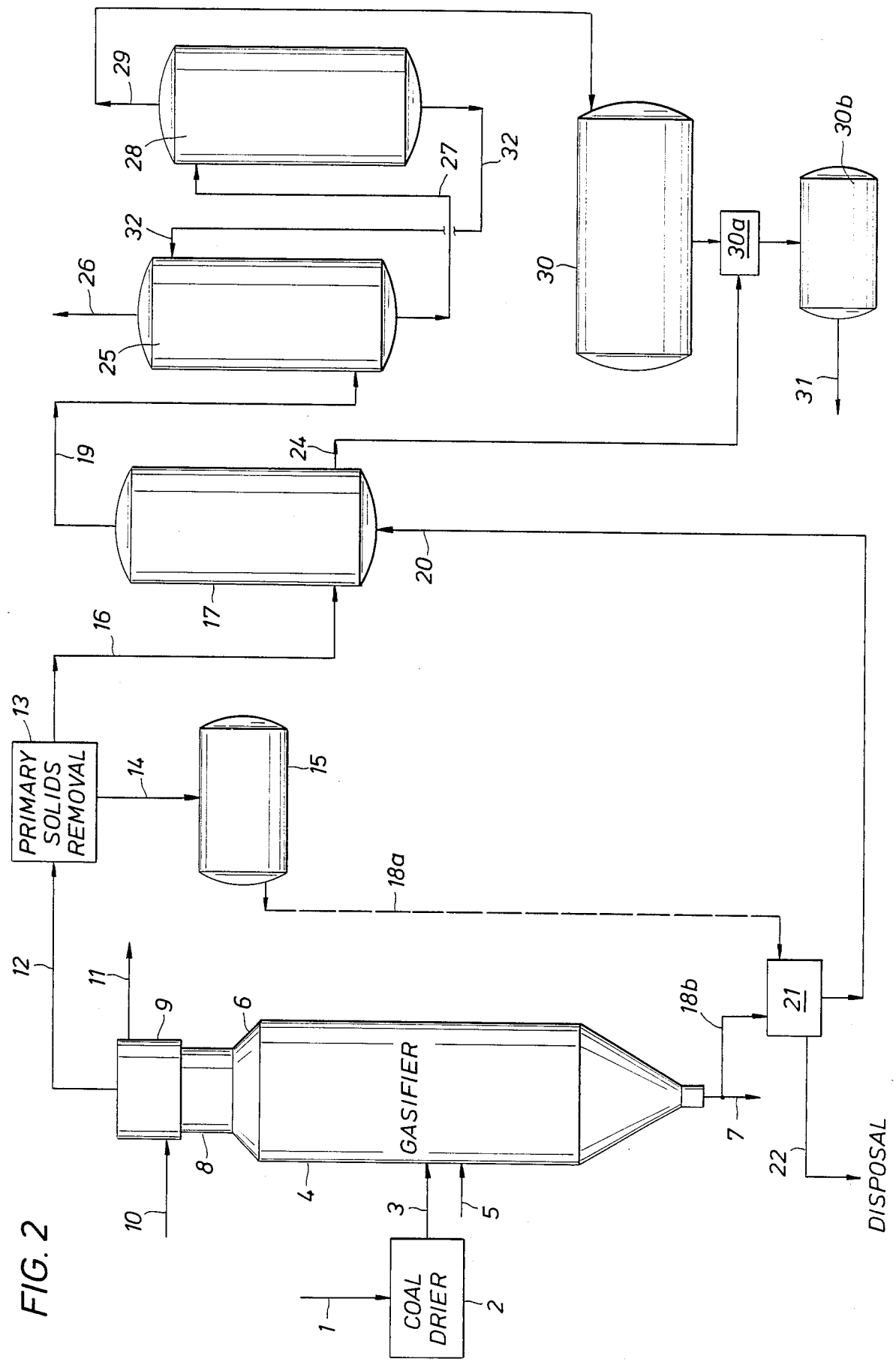
FIG. 2 is a schematic representation of the coal gasification embodiment, including a method of preparing the degassing catalyst bed of the present invention.

Accordingly, with reference to FIG. 2, pulverulent coal is passed via line (1) into a coal dyer (2) where the coal is dried, suitably at a temperature of about 200° C. The dry coal is subsequently discharged through a line (3) and passed into a gasification reactor (4) where it is gasified at a temperature of about 1500° C. to about 2000° C., a pressure of about 35 atmospheres absolute, with oxygen, which is supplied through a line (5). Duel coal injection is also contemplated. The gasification produces a product or synthesis gas which is removed from the upper portion (6) of the reactor, and a slag which is removed form the lower portion of the reactor via line (7). The gasification product is removed via conduit (8) where it is quenched and then passed through a boiler or heat exchange zone (9) where it is cooled to a temperature of about 200° C. In the heat exchange (9), water which is supplied through line (10) is converted by indirect heat exchange to high pressure steam, the steam being discharged through line (11). The cooled gasification product is passed through a line (12) to a series of cyclones (13) where the bulk of the particulates (flyslag) is removed and sent via line (14) to storage in vessel (15). The synthesis gas then passes via line (16) to treating zone (17) where it is contacted with slag carrier particles.

The slag from gasification reactor (4) and/or vessel (15) is sent via lines (18a) and/or preferably (18b) to the carrier selection unit (21) where it is processed, e.g., screened, to select carrier grade slag particles, e.g. from about 0.5 mm to about 10 mm, for utilization as a catalyst carrier and the remainder of the slag is removed via exit line (22) for other utilization or disposal. The size slag particles suitable for a carrier is not critical but of a size generally useful in the catalyst art.

The slag selected as suitable for use as a carrier is passed via line (20) to treating zone (17) wherein it is contacted with synthesis gas, preferably in cartridge units.

The treating zone is maintained at elevated temperatures and pressures and flow-rates sufficient to aid deposit of the metal sulfide. While this may vary to some degree depending on the metal sulfide, such conditions are within the conventional skill of the catalyst art. The synthesis gas stream entering the treating zone usually will have a temperature of about 150° C. to about 400° C. and a pressure of about 20–30 atmospheres. After the treating, synthesis gas passes from zone (17) through line (19) on to further treatment and/or recovery. Inorganic metal sulfide catalyst having the slag support is removed via line (24).

The gas stream is passed from zone (17) via line (19) into the absorption zone (25) in which it is countercurrently contacted with lean (fresh and recycle) absorbent solution (sulfolane or other absorbent to remove hydrogen sulfide) injected via line (32) and hydrogen sulfide is removed from the treated gas stream, which is removed via line (26). The loaded absorbent is removed from the absorption zone (25) via line (27) to a regeneration zone (28) where it is subjected, e.g., to steam stripping, to remove hydrogen sulfide from the absorbent which is recycled via line (32) and the hydrogen sulfide containing gas passed via line (29) to the sulfur recovery unit (30). The sulfur recovery unit is a conventional unit to prepare sulfur from sulfur-containing gases and can be of the type previously disclosed above, provided the unit is equipped to degas sulfur by passing the liquid sulfur through a bed of inorganic metal sulfide. This degassing metal sulfide catalyst bed is conveniently associated with the Claus unit as a bed (30a) positioned between each of the one or more Claus reactors and the central collection pit (30b), or as a cartridge bed or beds located directly in the pit (30b). Degassed liquid sulfur is recovered via line (31).

While the invention has been illustrated with particular apparatus, those skilled in the art will appreciate that, except where specified, other equivalent or analogous units may be employed. The term "zone", as employed in the specification and claims, includes, where suitable, the use of segmented equipment operated in series, or the division of one unit into multiple units to improve efficiency or overcome size constraints, etc. For example, a series of treating zones be employed, with different carriers, Parallel operation of units, is, of course, well within the scope of the invention.

What is claimed is:

1. A process for the prepatation of (1) synthesis gas reduced in solids and acidic gases and (2) elemental sulfur which comprises (a) treating coal, shale or tar sands with oxygen to produce a synthesis gas stream containing inorganic sulfide; (b) recovering slag particles from the treatment of coal in step (a) and selecting particles thereof suitable for use as a catalyst carrier; (c) treating the slag from step (b) with the synthesis gas substantially free of slag particles to deposit on the surface slag particles a catalytic amount of at lease one metal sulfide; (d) treating the synthesis gas from step (c) to remove acidic gases suitable for sulfur production; (e) converting the acid gases from step (d) to liquid sulfur; and (f) contacting the liquid sulfur with the catalytic slag particles from step (c) to reduce the hydrogen sulfide and hydrogen polysulfide content of the sulfur.

2. A process according to claim 1 wherein the carrier is slag from the partial oxidation of coal.

3. A process according to claim 1 wherein the inorganic sulfide is selected from CuS, PbS, CdS, MgS, CrS, TiS, FeS or mixtures thereof.

4. A process according to claim 3 wherein the inorganic sulfide is PbS.

5. A process according to claim 1 wherein the catalyst is used in a packed bed.

6. A process according to claim 1 wherein the catalyst is used in a trickle bed.

7. A process according to claim 1 wherein the catalyst is used in a cartridge bed.

8. A process according to claim 1 which comprises after step (f) a subsequent step of mechanically treating the liquid sulfur to release hydrogen sulfide.

9. A process according to claim 1 wherein slag from the partial oxidation of coal is treated with a gas stream from the partial oxidation of coal to deposit on the surface of the slag a mixture of sulfides.

10. A process according to claim 9 wherein the catalyst is used in a packed bed.

11. A process according to claim 9 wherein the catalyst is used as a trickle bed.

12. A process according to claim 9 wherein the catalyst is used as a cartridge bed.

13. A process according to claim 9 which comprises after step (f) a subsequent step of mechanically treating the liquid sulfur for release of hydrogen sulfide.

* * * * *